United States Patent [19]

Kraft

[11] Patent Number: 4,895,427
[45] Date of Patent: Jan. 23, 1990

[54] FIBER OPTIC CABLE

[75] Inventor: Heinrich A. Kraft, Hickory, N.C.

[73] Assignee: Siecor Corporation, Hickory, N.C.

[21] Appl. No.: 670,992

[22] Filed: Nov. 13, 1984

[51] Int. Cl.$^4$ .............................................. G02B 5/16
[52] U.S. Cl. .................................................. 350/96.23
[58] Field of Search ...................................... 350/96.23

[56] References Cited

U.S. PATENT DOCUMENTS

| 4,123,137 | 10/1978 | Marcatili | 350/96.23 |
| 4,355,865 | 10/1982 | Conrad et al. | 350/96.23 |
| 4,420,220 | 12/1983 | Dean et al. | 350/96.23 |
| 4,468,089 | 8/1984 | Brorein | 350/96.23 |
| 4,557,560 | 12/1985 | Bohannon, Jr. et al. | 350/96.23 |
| 4,627,686 | 12/1986 | Szentesi | 350/96.20 |

FOREIGN PATENT DOCUMENTS

| 0017905 | 1/1982 | Japan | 350/96.23 |
| 0186721 | 11/1982 | Japan | 350/96.23 |
| 2026718 | 2/1980 | United Kingdom | 350/96.23 |
| 2106266 | 4/1983 | United Kingdom | 350/96.23 |

OTHER PUBLICATIONS

"The next generation of Flexgel TM Compounds" by Levy et al., Bell Lab. Record, Jul./Aug. 1983 pp. 30–33.
"Experience to date with optical fiber cables" by Bahder et al., General Cable, pp. 380–384.

Primary Examiner—William L. Sikes
Assistant Examiner—Akm E. Ullah
Attorney, Agent, or Firm—J. David Abernethy

[57] ABSTRACT

Fiber optic cable comprising an elongated strength member, a plurality of optical fiber carrying means disposed around the outer periphery of the strength member and a plastic jacket circumscribing the optical fiber carrying means. The optical fiber carrying means comprises a tube, a plurality of optical fibers, at least one ribbon member disposed in the tube, and least one of the optical fibers being removably affixed to the ribbon member.

5 Claims, 2 Drawing Sheets

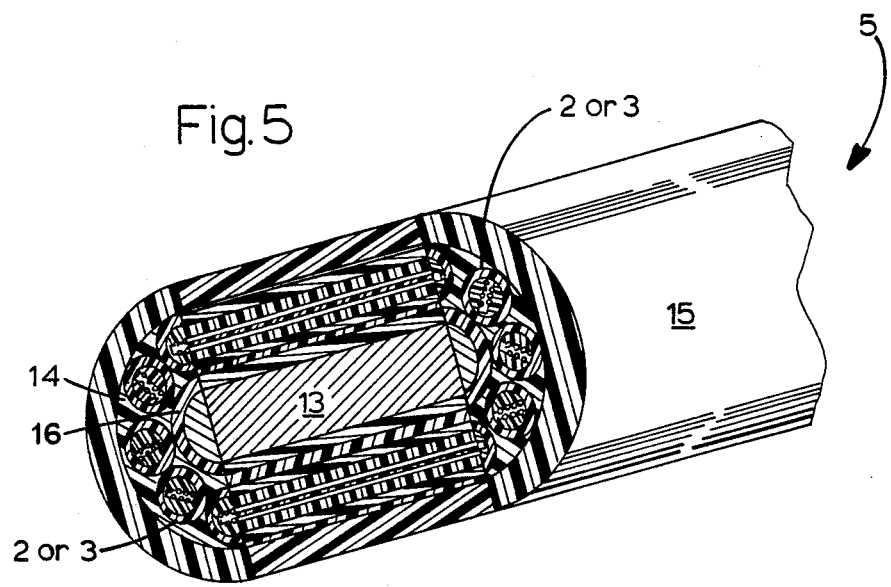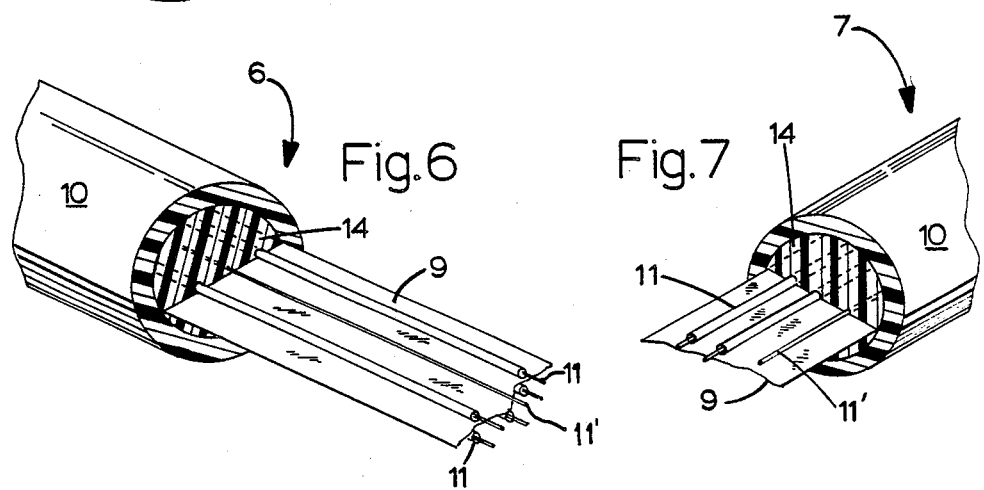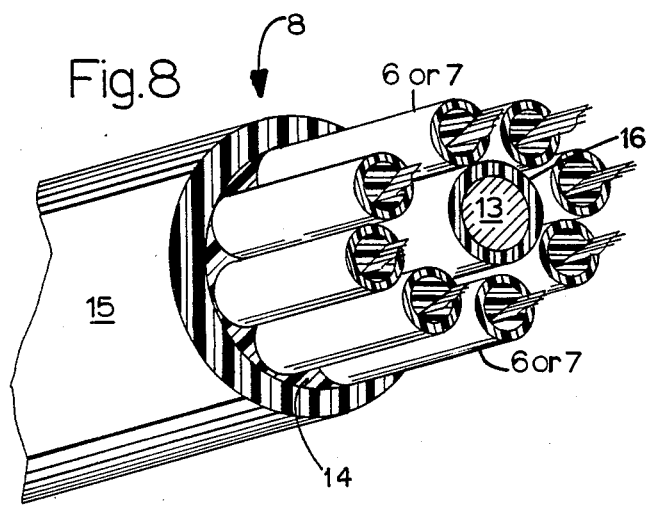

FIBER OPTIC CABLE

BACKGROUND OF THE INVENTION

The basic elements of most present day fiber optic cable are four in number: (1) a strength member; (2) a plurality of tubes disposed on and around the outer periphery of the strength member; (3) optical fibers in the tubes; and (4) a sheath or jacket circumscribing the tubes. In some optical cable designs, the tubes are divided into groups, one group of tubes containing fibers (system fibers) intended to be used for transmission purposes (transmitting and receiving) and another group of tubes contain fibers that are intended to be used as spares (protection spares, assigned spares for a given and identified transmission system). Usually the tube containing the system (working) fibers has a color code that identifies it with a tube containing the assigned spares so that they may be physically related one to another. Due to such an arrangement, any outage or failure of a transmission path arising out of a failure of a transmission fiber can be repaired by using one or more of the fibers in the assigned spares tube. When the original tranmission path is repaired, the spare is disconnected (deactivated) and resumes its "spare" function. This switching back and forth between the system fibers and their associated spares is accomplished automatically by prior art switching devices.

Even though a tube which carries system fibers is color coded to identify a given assigned spares tube associated therewith, when the jacket of prior art optical fiber cable is split opened to expose the tubes (both system tubes and assigned spares tubes), there is a propensity for the system tubes to become physically separated from its corresponding spares tubes; thus, the possibility of error creeps in the selection of the right color coded tube and its associated assigned spares tubes notwithstanding that such tubes (transmission/spares) are adjacent one to another in the as manufactured cable structure.

It is towards the solution of this problem that the present invention is directed.

BRIEF DESCRIPTION OF THE INVENTION

The present invention contemplates a fiber optic cable containing a strength member and a plurality of optical fiber carrying means disposed around the periphery of the strength member. It further contemplates a plastic jacket circumscribing the optical fiber carrying means. Each of the fiber optic carrying means comprises a tube in which there is disposed a plurality of optical fibers. Also disposed in the tube is at least one ribbon member and at least one of the optical fibers in the tube is removably affixed to the ribbon member. In the usual circumstance, each tube contains at least two ribbon members and on the one ribbon member there is disposed the system (transmission and receiving) fibers. On the other ribbon there is disposed a plurality of fibers that are used as spares. Consequently, there is no danger that one ribbon from one tube can be confused with another ribbon of another tube, thus spares for one system be confused with another system. Spares of a given transmission system are enclosed in the same tube along with those fibers that are used as the transmission and receiving (system) fibers in issue. BRIEF DESCRIPTION OF THE DRAWING FIG. 1 is an isometric cutaway view of a prior art optical fiber cable.

FIG. 5 is an isometric cutaway view of a fiber optic cable employing the tubes and ribbons of Figures 2 and 3.

FIGS. 6 and 7 are isometric cutaway views of two different embodiments of a tubular optical fiber carrying means in which optical fibers are disposed and mechanically affixed to a ribbon member.

FIG. 8 is an isometric cutaway view of a fiber optic cable employing the tubes (optical fiber carrying means) and ribbons of FIGS. 6 and 7.

DETAILED DESCRIPTION OF THE INVENTION

Figure 1:
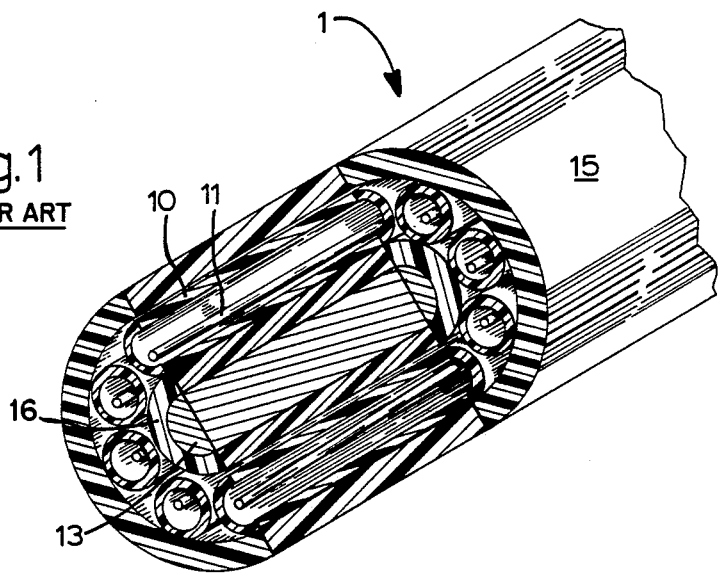

Shown by element 1 of FIG. 1 is a cutaway isometric view of a prior art of fiber optic cable. Such cable has as its basic components a strength member 13 (usually made from steel) circumscribed by an insulating plastic 16. On the outside periphery of insulating plastic 16 are disposed a plurality of optical fiber carrying means, usually a tube 10 in which optical fibers 11 are disposed. As previously explained, the prior art may use-designate, every other tube as a transmission and receiving or systems tubes, each of these tubes containing an optical fiber that is used in active transmission and receiving of voice and data signals. The balance of the tubes may be designated as "spares" and contain optical fibers which are normally not in the transmission system, but are put in the transmission system on a temporary basis when the system fibers are damaged. Until this damage is repaired, the spare fiber acts as a transmission path. Circumscribing optical fiber carrying means 10 is the customary jacket or sheath 15.

Figure 2:
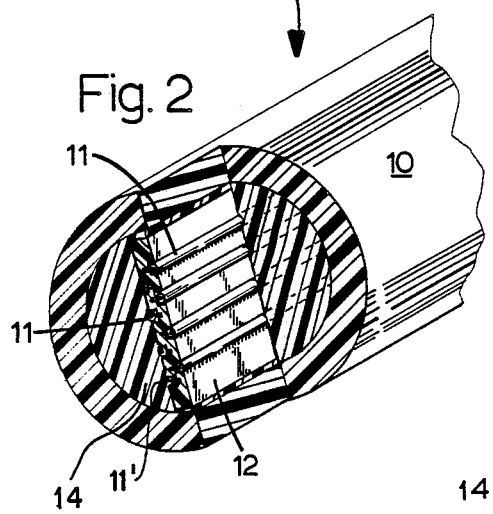
FIGS. 2 and 3 are isometric cutaway views of two different embodiments of optical fibers mechanically affixed to a ribbon member and are disposed in a tubular optical fiber carrying means.

Element 2 of FIG. 2 is one embodiment of the optical fiber carrying means of the present invention and is an improvement over the like numbered element shown in FIG. 1. Optical fiber carrying means 3 comprised tube 10 and ribbon member 12, in which there are a plurality of longitudinally aligned slots. In such slots there are a plurality of optical fibers, either bare or tightly buffered. The space delimited by tube 10, not otherwise occupied by a ribbon 4 or 9 and optical fibers 11 and 11 can be, if desired, filled with a prior art type filling compound. Element 2 (FIG. 2) shows a singular ribbon 12 on and in which optical fibers 11 and 11' are mechanically but removably disposed as shown in more detail as element 4 in FIG. 4. Another embodiment shown as element 3 in FIG. 3, is comprised of tube 10 and two ribbons 12 containing optical fibers 11 and 11' as shown in more detail by element 4 in FIG. 4.

Figure 3:
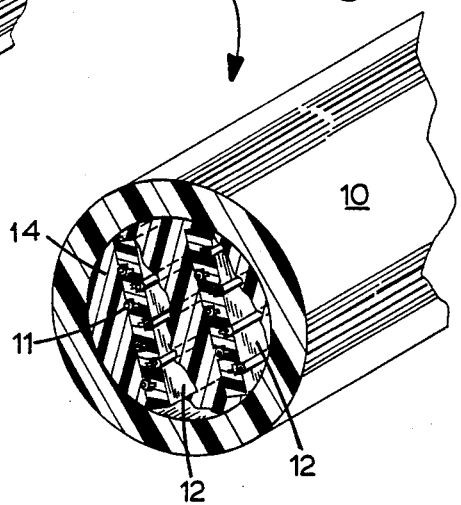
Figure 4:
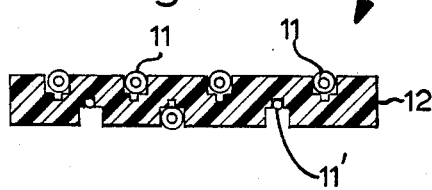
FIG. 4 is a cross section detail view of the ribbon structure employed in FIGS. 2 and 3.

Element 4 of FIG. 4 is a cross section view of ribbons 12 of FIGS. 2 and 3 and contain a plurality of longitudinally spaced apart slots therein, each of the slots being composed of two slots, one superimposed on top of the other. One of the slots has a transverse dimension far greater than the other and the one with the greatest transverse dimension communicates with the upper surface of ribbon 11. The slot having the smallest transverse dimension communicates only with the bottom portion of the first mentioned slot. The purpose of these two superimposed slots is to accommodate either a bare fiber or a buffered fiber, a bare fiber being depicted by element 11' and a buffered fiber being shown as element 11. A buffered fiber is a fiber that has a coating of plastic circumscribing the optical fiber. Unbuffered optical fibers can be accommodated in the lowermost slot as shown by element 11 wherein optical fibers having a large diameter or buffered fibers can be accommodated in the larger slot.

Referring back to FIG. 2, transmission fibers 11 and 11' can be on one side of ribbon 12 whereas the spares of such transmission fibers could be located on the other side. If it is desired, ribbon 12 can be multi-colored, one surface having a given color and a different color appearing on the other surface, so that the spares of the fibers used for transmission can be readily distinguished from the fibers to be associated with but will be designated as spares for a given set of transmission fibers. A similar sort of designation or coloring scheme can be used for element 12 of FIG. 3; e.g., one of the ribbons 12 could be denoted as transmission and receiving fibers and the other ribbon as spare fibers. Their respective plastic ribbons 12 could be the same or of a different color, one from another.

Element 5 of FIG. 5 shows a fiber optic cable made using the fiber optic carrying means 2 and 3 of FIGS. 2 and 3. It will be noted that such cable has the basic strength member 13, insulation 16 and disposed on the outer periphery of insulation 16 a plurality of tubes, having the structure as set forth as previously described as elements 2 and 3. Circumscribing fiber optic carrying means 2 and 3 is a jacket 15 of any suitable plastic. The volume delimited by jacket 15 not otherwise occupied by the strength member, its insulation and optical fiber carrying means 2 or 3 may be filled with any suitable prior art filling compound 14.

Shown by elements 6 and 7 in FIGS. 6 and 7 is still another embodiment of the optical fiber carrying means 10. It will be noted that embodiments 6 and 7 are somewhat similar to embodiments 2 and 3 except that the ribbon member in embodiment 6 and 7 is a tape 9 on which one or more sides is disposed an adhesive. By means of this adhesive, either bare optical fibers or tightly buffered optical fibers 11 and 11' and tapes 10 not otherwise occupied by optical fibers 11 and 11' respectively are removably affixed. These fibers can be affixed to either one or more sides as shown. Like embodiments 2 and 3, the space delimited by tube 10 not otherwise occupied by optical fibers 11 and 11' and tape 9 may be filled with any one of the known prior art filling compounds 14. One or more tapes 9 can be disposed inside of tube 10. As was the case with element 3 of FIG. 3 and further with the coloring of element 12 of FIGS. 2 and 3, one side of tape 9 can be one color and the other side of tape 9 can be still another color or the same color to as to facilitate the distinction between fiber spares on the one hand and system fibers on the other.

Shown by element 8 in FIG. 8 is fiber optic cable employing the optical fiber carrying means of embodiment 6 and 7. Basically, the cable is made up of the strength member 13 circumscribed by insulation 16 and on the outer surface of insulation 16 is disposed a plurality optical fiber carrying means 6 and 7, the details of which have been previously described. Circumscribing optical fiber means 6 and 7 is a plastic jacket 15. In embodiment 8, as well as in the embodiment shown as element 5, the fibers used as system fibers (transmission and receiving) can be readily distinguished or associated with optical fibers that have been dedicated as spares for that particular transmission system. Not only are the system fibers associated in the same tube as their associated spares, they are also associated on the same tape or on a different tape as the case may be, thus rendering it very unlikely that the spares of one system be confused with the spares of another or the system fibers of one system be confused with the system of another or with other spares.

What is claimed is:

1. A fiber optic cable, comprising:
   (a) a tube in an optical cable; and
   (b) a ribbon having two sides each having a plurality of slots disposed in the tube; and
   (c) a plurality of optical fibers, each optical fiber disposed
   in a ribbon slot.

2. A fiber optic cable as recited in claim 1, wherein at least one slot on each side of the ribbon carries an optical fiber.

3. A fiber optic cable as recited in claim 2, wherein each optical fiber is held in a ribbon slot having substantially the same transverse width as the optical fiber disposed in the slot.

4. A fiber optic cable as recited in claim 3 wherein the two sides of the ribbon have different colors.

5. A fiber optic cable as recited in claim 1, wherein each ribbon slot comprises a first section of one width and a second section of a different width.

* * * * *